US008606105B2

(12) United States Patent
Ong

(10) Patent No.: US 8,606,105 B2
(45) Date of Patent: Dec. 10, 2013

(54) VIRTUAL CORE ROUTER AND SWITCH SYSTEMS AND METHODS WITH A HYBRID CONTROL ARCHITECTURE

(75) Inventor: Lyndon Y. Ong, Sunnyvale, CA (US)

(73) Assignee: Ciena Corporation, Hanover, MD (US)

( * ) Notice: Subject to any disclaimer, the term of this patent is extended or adjusted under 35 U.S.C. 154(b) by 211 days.

(21) Appl. No.: 13/233,603

(22) Filed: Sep. 15, 2011

(65) Prior Publication Data

US 2013/0071116 A1 Mar. 21, 2013

(51) Int. Cl.
*H04J 14/00* (2006.01)
*H04J 11/00* (2006.01)

(52) U.S. Cl.
CPC .................................. *H04J 11/0066* (2013.01)
USPC .................................. 398/51; 398/47; 398/54

(58) Field of Classification Search
USPC ...................................... 398/45–49, 55, 51, 54
See application file for complete search history.

(56) References Cited

U.S. PATENT DOCUMENTS

| | | | |
|---|---|---|---|
| 6,486,983 | B1 | 11/2002 | Beshai et al. |
| 6,678,474 | B1 * | 1/2004 | Masuda et al. ................. 398/75 |
| 7,164,679 | B2 | 1/2007 | Kotha et al. |
| 7,269,185 | B2 * | 9/2007 | Kirkby et al. ................. 370/469 |
| 7,315,897 | B1 | 1/2008 | Hardee et al. |
| 7,881,229 | B2 | 2/2011 | Weinstein et al. |
| 7,937,438 | B1 | 5/2011 | Miller et al. |
| 7,944,844 | B2 | 5/2011 | Ee et al. |
| 7,953,865 | B1 | 5/2011 | Miller et al. |
| 7,991,859 | B1 | 8/2011 | Miller et al. |
| 2002/0097747 | A1 | 7/2002 | Kirkby et al. |
| 2006/0126642 | A1 | 6/2006 | Kojima et al. |
| 2008/0095176 | A1 | 4/2008 | Ong et al. |
| 2009/0074414 | A1 | 3/2009 | Miles et al. |
| 2009/0138577 | A1 | 5/2009 | Casado et al. |
| 2010/0061394 | A1 | 3/2010 | Sindhu et al. |
| 2011/0080836 | A1 | 4/2011 | Bragg et al. |
| 2011/0188273 | A1 | 8/2011 | Pansier et al. |
| 2011/0235647 | A1 * | 9/2011 | Baba et al. ................. 370/401 |

OTHER PUBLICATIONS

Lyndon Y. Ong; "Ciena's Intelligent Optical Network Deployment and Directions"; OIF Technical Committee, Session 102—Dec. 2, 2009.
Guru Parulkar, Sauray Das, Nick McKeown, Preeti Singh, Dan Getachew, and Lyndon Ong; "Packet and Circuit Convergence with OpenFlow"; Stanford Clean Slate Program, Nov. 2009.

(Continued)

*Primary Examiner* — Dalzid Singh
(74) *Attorney, Agent, or Firm* — Clements Bernard PLLC; Christopher L. Bernard; Lawrence A. Baratta, Jr.

(57) ABSTRACT

The present disclosure provides virtual router/switch systems and methods with a domain of optical switches operating as a single, virtualized router using a control plane design combining centralized control of higher layer packet switching functions with distributed control over transport switching functions. The virtual router systems and methods simplify and reduce cost of Internet Protocol (IP) networks by removing the core routers, replacing them with lower cost, high capacity optical switches which are Packet Optical Transport Systems (POTS). The virtual router systems and methods avoids full mesh connectivity of the edge routers and the associated need to maintain routing adjacencies to each of the other edge routers. The virtual router systems and methods include a centralized IP layer management. Further, the virtual router systems and methods include distributed control of the optical layers.

16 Claims, 12 Drawing Sheets

(56) References Cited

OTHER PUBLICATIONS

Guru Parulkar, Sauray Das, Nick McKeown, Preeti Singh, Dan Getachew, and Lyndon Ong; "Packet and Circuit Network Convergence with OpenFlow"; Paper presented Nov. 2009.
OpenFlow Switch Specification, Version 1.1.0 Implemented (Wire Protocol 0×02); Feb. 28, 2011.
Nick McKeown, Tom Anderson, Hari Bajakrishnan, Guru Parulkar, Larry Peterson, Jennnifer Rexford, Scott Shenker, and Jonathan Turner; "OpenFlow: Enabling Innovation in Campus Networks"; Presented Mar. 14, 2008.
Gregor V. Bochman, Design of an Agile All-Photonic Network:, Proc. of SPIE vol. 6784, Jan. 1, 2007.
Extended European Search Report, Jan. 25, 2013, European Patent Application No. 12184597.8.

* cited by examiner

VIRTUAL CORE ROUTER AND SWITCH SYSTEMS AND METHODS WITH A HYBRID CONTROL ARCHITECTURE

FIELD OF THE INVENTION

The present invention relates generally to networking systems and methods. More particularly, the present invention relates to virtual router/switch systems and methods with a domain of optical switches operating as a single, virtualized router/switch using a control plane design combining centralized control of higher layer packet switching functions with distributed control over transport switching functions.

BACKGROUND OF THE INVENTION

Referring to FIG. 1, conventionally, carrier Internet Protocol (IP) networks such as an exemplary network 100 are organized in tiers, where the lower tiers 102, 104, 106, 108 include edge routers 110 that connect to larger core routers 112. The edge routers 110 perform numerous IP protocol functions, whereas the core routers 112 are mostly called upon to forward traffic from one edge router 110 to another. Also, adjacent routers 110, 112 all support the same set of IP protocols. Currently, the lower layers supporting IP are treated as static IP links in order to avoid interference between the IP routing protocol and any dynamic reconfiguration of the lower layers, e.g. changes in the IP topology, may result in a need to reconverge the routing tables, causing an interruption in traffic. Further, the IP routers 110, 112 do not have the processing power to handle both the IP layer and lower layer topologies. As a result, multilayer control mechanisms such as Generalized Multi-Protocol Label Switching (GMPLS) (e.g., as defined by the Internet Engineering Task Force (IETF) in Requests for Comment (RFC) 3945, RFC 3471, RFC 3209, RFC 3479, etc., the contents of each are incorporated by reference herein) have not been deployed in practice in carrier IP networks.

The core router 112 is involved in the movement of any IP packets between edge routers 110, and as a result must handle very large amounts of traffic. Accordingly, the cost of core routers 112 is very high, however the actual use of IP protocols is relatively small since the core router 112 function is simply forwarding the packets between the actual packet source and destination. One option is to connect the edge routers 110 directly to one another, i.e. simply removing the core routers 112. However, directly connecting the edge routers 110 at an IP level results in a full mesh of connectivity between the edge routers 110, and introduces a significant penalty at the IP level to maintain adjacencies with every other edge router 110. Furthermore, interoperability of the routing protocols adds another constraint. Distributed IP routing protocols require that each router 110, 112 make the same routing decisions in order to avoid the creation of routing loops that could bring down the IP network 100. This creates a strong requirement that router software be interoperable and consistent, making it very difficult to introduce new functions or to allow a carrier to introduce a new IP vendor because of the risk of introducing routing problems.

BRIEF SUMMARY OF THE INVENTION

In an exemplary embodiment, an IP network includes a plurality of edge routers and a virtual core router interconnecting the plurality of edge routers; wherein the virtual core router includes a domain of interconnected optical switches in communication with a packet controller, the domain of interconnected optical switches and the packet controller are configured to cooperatively implement the virtual core router such that the plurality of edge routers view the domain of interconnected optical switches and the packet controller as the virtual core router from a topology perspective. The IP network may further include a centralized control plane for packet switching functions on the interconnected optical switches, and a distributed control plane for transport switching functions on the interconnected optical switches. The plurality of edge routers may be configured to peer with the virtual core router in lieu of peering directly with one another. Optical switches connected to the plurality of edge routers may be communicatively coupled to the packet controller, and the plurality of edge routers may be configured to exchange messages to the packet controller through the optical switches connected to the plurality of edge routers. The IP network may further include a proxy communicatively coupled to optical switches connected to the plurality of edge routers; wherein the proxy may be communicatively coupled to the packet controller, and the plurality of edge routers may be configured to exchange messages to the packet controller through the optical switches connected to the plurality of edge routers. The packet controller may view the optical switches as a single entity through the proxy, and the proxy may include a network or element management system. The packet controller may be configured to provision optical forwarding tables in the optical switches to connect virtual ingress port to virtual egress port. The virtual ingress port and the virtual egress port may be disposed in separate network elements of the optical switches. The virtual core router may be configured to generate link topology updates and may be part of control plane interactions in the centralized control plane for packet switching functions. The optical switches connected to the plurality of edge routers may be communicatively coupled to the packet controller such that the virtual core router functions as a single virtual switch to the plurality of edge routers, and wherein the packet controller may be configured to respond to control messages from the plurality of edge routers through the optical switches connected to the plurality of edge routers.

In another exemplary embodiment, a network includes a plurality of interconnected packet optical transport systems, at least two of the packet optical transport systems communicatively coupled to at least two edge routers; a packet controller in communication with the plurality of interconnected packet optical transport systems; a centralized control plane for packet switching functions; and a distributed control plane for transport switching functions on the plurality of interconnected packet optical transport systems; wherein, from a topology perspective, the at least two edge routers view the plurality of interconnected packet optical transport systems as a single entity for the packet switching functions. The single entity may include a virtual core router and the at least two edge routers may be configured to peer with the virtual core router in lieu of peering directly with one another. The single entity may include a virtual core switch viewed by the at least two edge routers as a single large fabric, and wherein the packet controller may be configured to respond to control messages from the at least two edge routers to the at least two of the packet optical transport systems. The packet controller may be configured to provision optical forwarding tables in the at least two of the packet optical transport systems to connect virtual ingress port to virtual egress port. The virtual ingress port and the virtual egress port may be disposed in separate network elements. The at least two of the packet optical transport systems may be communicatively coupled to the packet controller. The network may further include a proxy between the at least two of the packet optical transport systems and the packet controller; wherein the packet controller may view the at least two of the packet optical transport systems as a single device through the proxy.

In yet another exemplary embodiment, a method includes operating a plurality of edge routers; interconnecting the plurality of edge routers between one another through a virtual device, the virtual device including a plurality of interconnected optical switches and a packet controller communicatively coupled to the plurality of interconnected optical switches; operating a distributed control plane for transport switching functions on the plurality of interconnected optical switches; and operating a centralized control plane for packet switching functions on the plurality of interconnected optical switches. The method may further include peering between the plurality of edge routers and the virtual device such that the plurality of edge routers are not required to maintain routing adjacencies between one another. The method may further include implementing the virtual device though the plurality of interconnected optical switches and the packet controller to remove core routers between the plurality of edge routers.

In still yet another exemplary embodiment, a packet optical switch includes a plurality of ports, and a switching fabric configured to communicatively couple the plurality of ports therebetween; wherein the switching fabric is configured to provide data switching controlled by a packet controller external to the packet optical switch with the packet controller configured to control the packet optical switch and additional packet optical switches such that they collectively operate as a single virtual router or switch; and wherein the virtual router or switch is communicatively coupled to a plurality of edge routers.

BRIEF DESCRIPTION OF THE DRAWINGS

The present invention is illustrated and described herein with reference to the various drawings of exemplary embodiments, in which like reference numbers denote like method steps and/or system components, respectively, and in which.

DETAILED DESCRIPTION OF THE INVENTION

In various exemplary embodiments, the present invention relates to virtual router/switch systems and methods with a domain of optical switches operating as a single, virtualized router/switch using a control plane design combining centralized control of higher layer packet switching functions with distributed control over transport switching functions. The virtual router/switch systems and methods simplify and reduce cost of IP networks by removing the core routers 112, replacing them with lower cost, high capacity optical switches which are Packet Optical Transport Systems (POTS). The virtual router/switch systems and methods further avoid full mesh connectivity of the edge routers 110 and the associated need to maintain routing adjacencies to each of the other edge routers 110. In addition, the core can be converted to the POTS without requiring new control plane functionality from the edge routers 110, such as support of Multi-Protocol Label Switching (MPLS) Label Switch Paths (LSPs) or Virtual Local Area Network (VLAN) provisioning. The virtual router/switch systems and methods include a centralized IP layer management reducing issues of interoperability of the IP routing protocols and limiting complexity of software needed on the POTS itself, as well as the testing requirements and risks of interoperability with the routers. Further, the virtual router/switch systems and methods include distributed control of the optical layers retaining advantages of distributed control at the lower layers, enabling automated discovery, topology distribution, and failure recovery that would otherwise need to be handled by the central controller, with some loss of performance.

Figure 1:
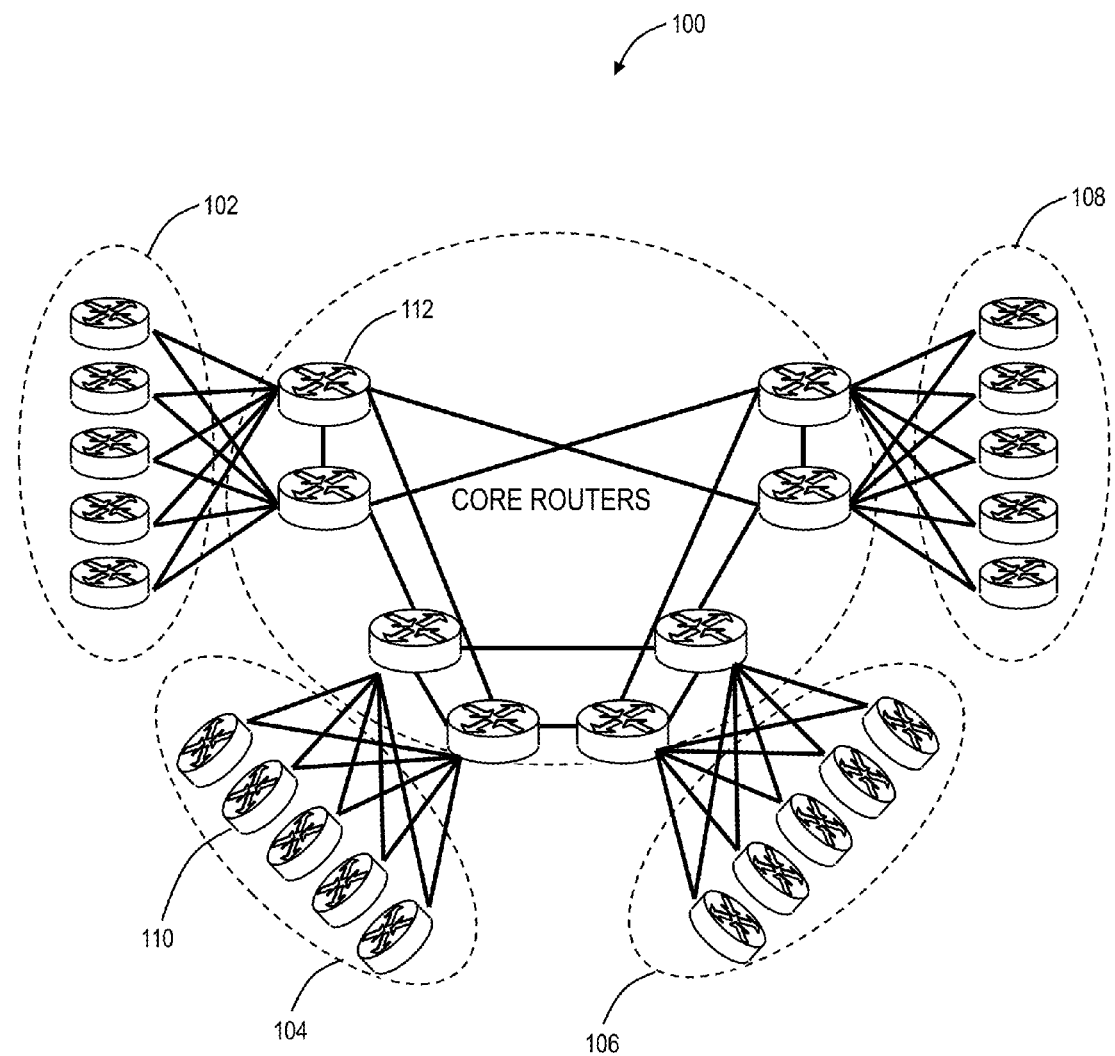
FIG. 1 is a network diagram of an Internet Protocol (IP) network organized in tiers, where the lower tiers include edge routers that connect to larger core routers.
Figure 2:
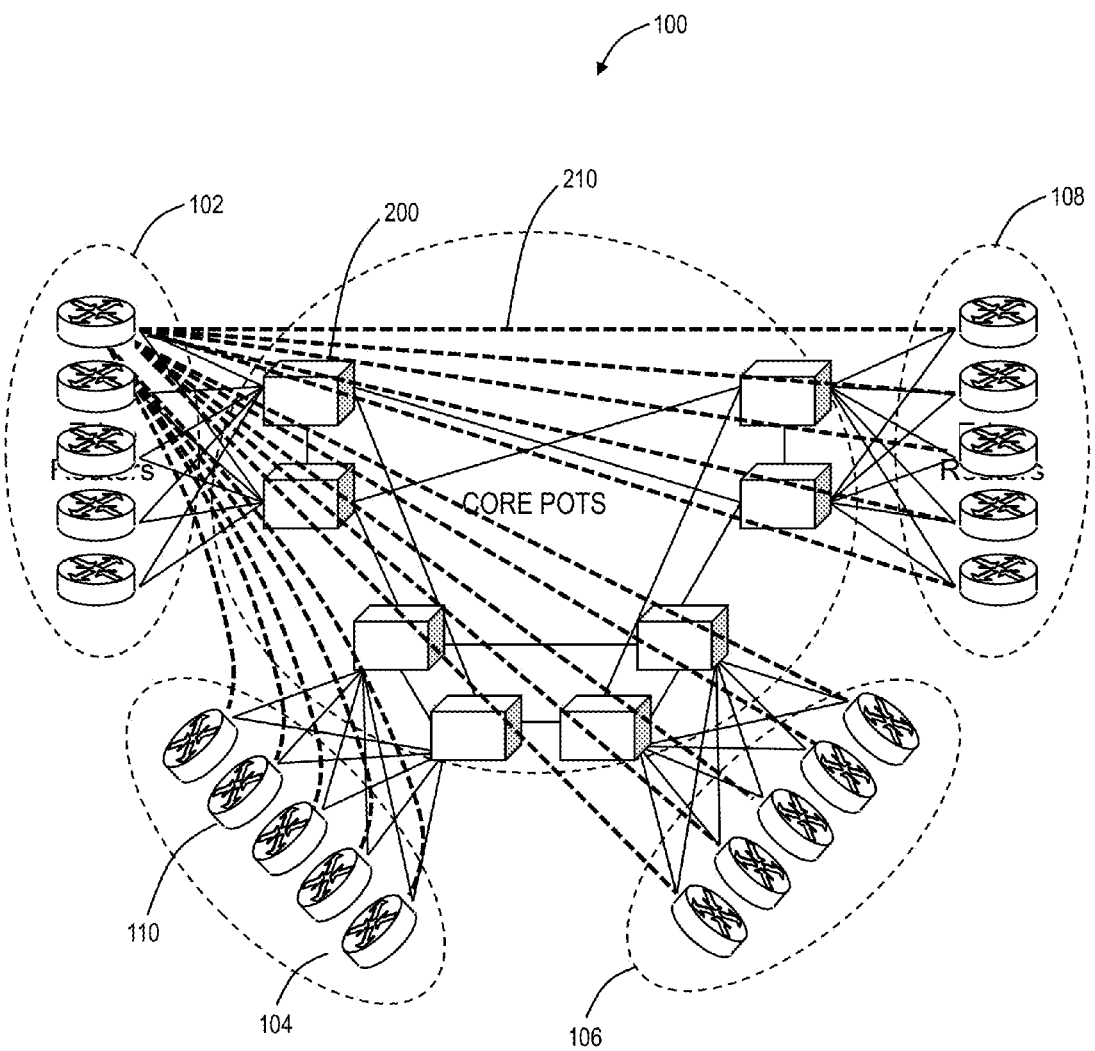
FIG. 2 is a network diagram of the IP network of FIG. 1 with the larger core routers replaced with Packet Optical Transport Systems (POTS), e.g. optical switches.

Referring to FIG. 2, in an exemplary embodiment, the network 100 is illustrated with a plurality of POTSs 200 replacing the core routers 112. As described herein, the POTS 200 is a network element or node in the network 100 that is a multi-layer switch providing optical and packet switching at Layers 0 (WDM), 1 (SONET/SDH/OTN), 2 (Ethernet), and/or 3 (IP). Effectively, the POTS 200 is a combined optical and packet switching device, and an exemplary implementation of the POTS 200 is illustrated herein in FIG. 10. Generally, the POTS 200 may be any type of switching system in the network 100 with packet switching capability, e.g. an optical switch, a wavelength division multiplexing (WDM) element, a digital cross connect, a SONET/SDH multiplexer, an Optical Transport Network (OTN) element, an Ethernet switch, and the like. The POTS 200 are an attractive option to carriers as these devices provide existing functionality in the network 100 such as optical transport and switching and can be adapted to support packet switching functionality.

The POTS 200 are configured to directly connect the edge routers 110 to one another at the IP level. For example, the POTS 200 may include Ethernet-based ports that directly connect the edge routers 110 over optical connections in the network 100. That is, the POTS 200 with packet capability is used to replace the core routers 112, using packet virtual circuit connections to connect each edge router 110 directly to each possible destination edge router 110. However, simply replacing the core routers 112 with the POTS 200 to results in routing adjacencies 210 which must be maintained between each of the edge routers 110. The routing adjacencies 210 introduce major overhead due to the maintenance of routing adjacencies between each pair (e.g., HELLO messages, state machine processes and overhead, etc.). Also, additional control overhead is required at the edge router 110 in order to either control virtual circuits across the POTS 200 network (such as MPLS LSPs) or to configure VLANs in order to control forwarding of packets across the POTS 200 network. In practice, the routing adjacencies 210 cause difficulties in deployment of the POTS 200 as a simple replacement of the core routers 112.

Figure 3:
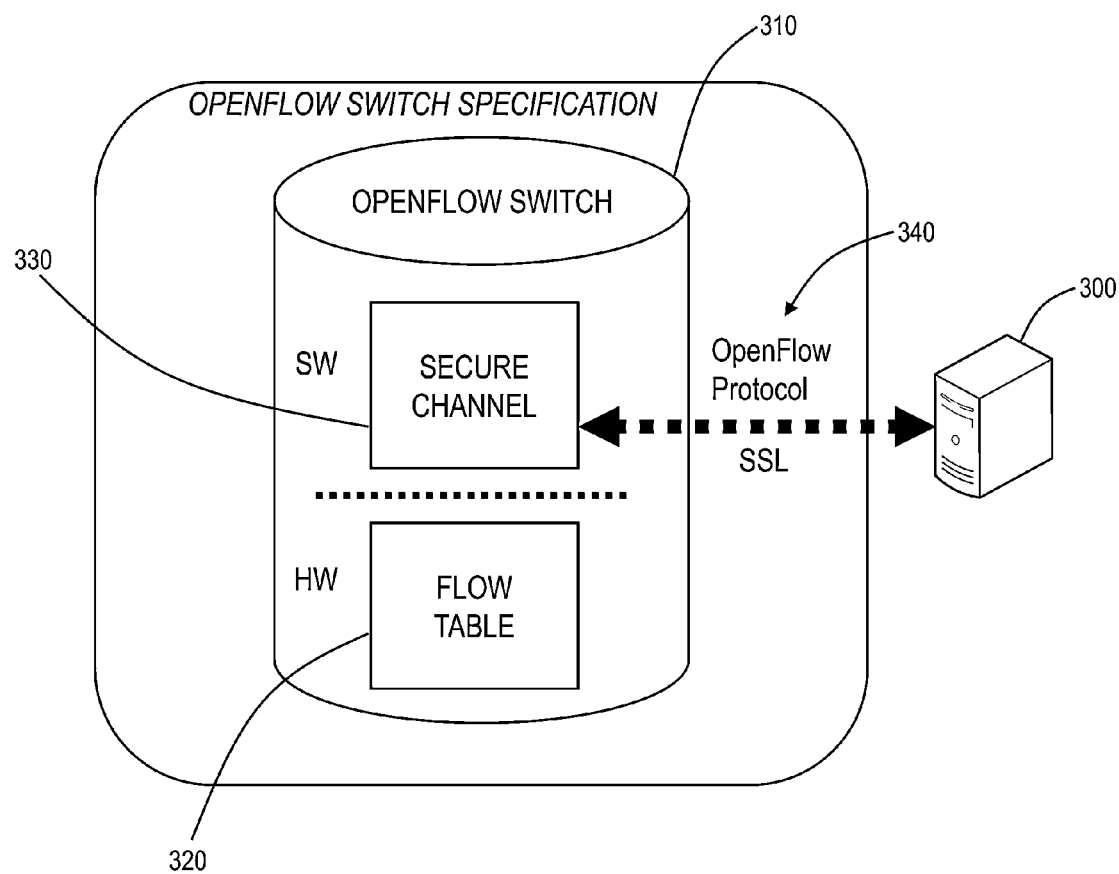
FIG. 3 is a block diagram of a centralized controller and processes executed thereon for a control interface into each edge router.

Referring to FIG. 3, in an exemplary embodiment, a block diagram illustrates a centralized controller 300 and processes executed thereon for a control interface into each edge router 110. Generally, the centralized controller 300 configures the forwarding tables in the edge routers 110 thereby removing the need for the edge routers 110 to exchange routing information using the routing protocol. In an exemplary embodiment, the centralized controller 300 may utilize OpenFlow (available at www.openflow.org/documents/openflow-spec-v1.1.0.pdf, e.g. OpenFlow Switch Specification Version 1.1.0, February 2011, the contents of which are incorporated by reference herein). For example, OpenFlow enables networks to evolve, by giving the centralized controller 300 the power to modify the behavior of network devices such as the edge routers 110, through a well-defined "forwarding instruction set". Those of ordinary skill in the art will recognize the virtual router/switch systems and methods contemplate use of other systems and methods for centralized control of the edge routers 112 in addition to OpenFlow. Centralized control solutions such as OpenFlow solve some of the problems with interoperability and distributed routing protocols by making the network elements, i.e. the edge routers 110, less intelligent and reducing the interoperability requirements. However, deploying OpenFlow at all routers 110 requires OpenFlow to scale considerably, and to support real-time failure recovery functions that may be inconsistent with a centralized scheme.

In FIG. 3 and with reference to OpenFlow as an exemplary embodiment, the centralized controller 300 is communicatively coupled to an OpenFlow switch 310. The OpenFlow switch 310 may include the edge router 110. The OpenFlow switch 310 includes a flow table 320 which includes an action associated with each flow entry, to tell the switch 310 how to process the flow. In an exemplary embodiment, the flow table 320 may be implemented in hardware (HW) in the switch 310. The OpenFlow switch 310 further includes a secure channel 330 that connects the switch 310 to the controller 300, allowing commands and packets to be sent between the controller 300 and the switch 310 using an OpenFlow Protocol 340, which provides an open and standard way for the controller 300 to communicate with the switch 310. By specifying a standard interface (the OpenFlow Protocol 340) through which entries in the flow table 320 can be defined externally, the OpenFlow Switch 310 enables remote control of the switch 310 via the centralized controller 300. The OpenFlow Protocol 340 exploits the fact that most Ethernet switches and routers contain flow-tables (typically built from ternary content addressable memories (TCAMs)) that run at line-rate to implement firewalls, Network Address Translation (NAT), Quality of Service (QoS), and to collect statistics. Despite implementation differences between flow-tables, commonality may be exploited for an open protocol to program the flow-table in different switches and routers.

Figure 4:
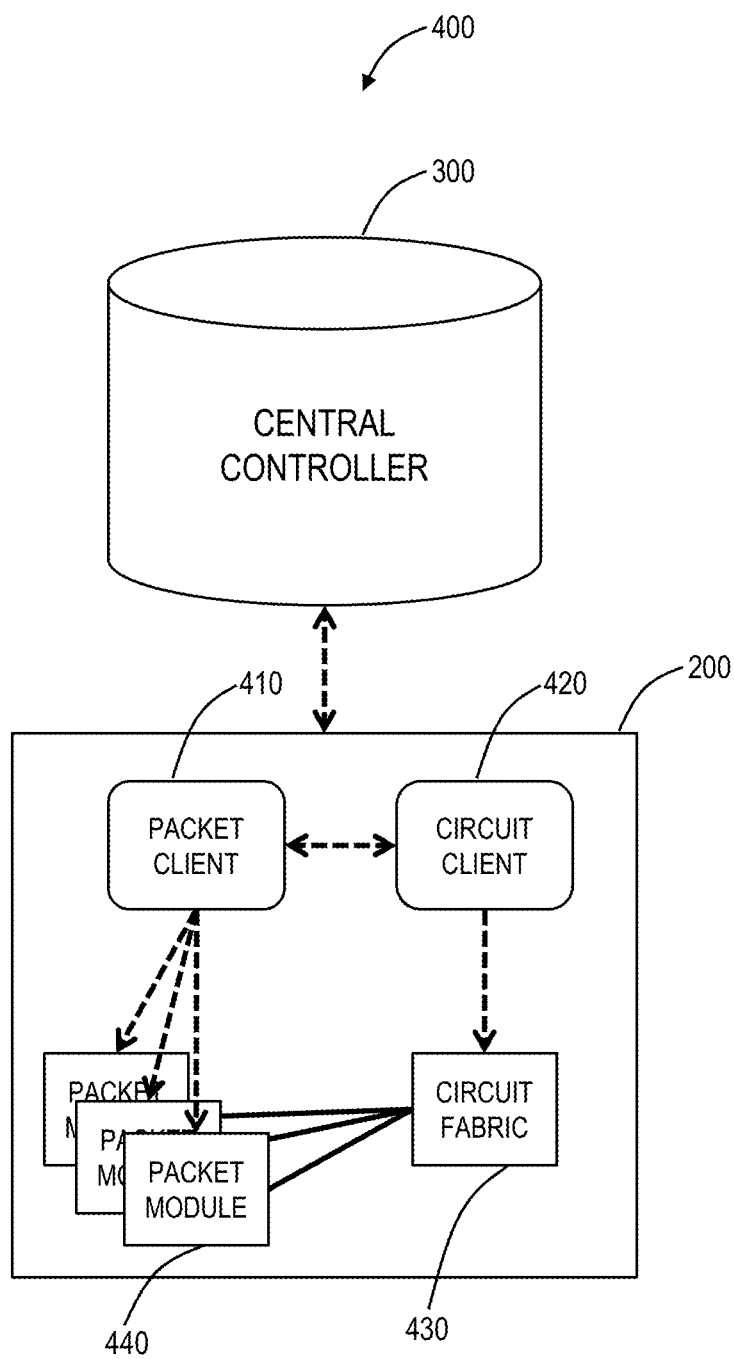
FIG. 4 is block diagram of a multilayer system using the centralized controller and the POTS.

Referring to FIG. 4, in an exemplary embodiment, a block diagram illustrates a multilayer system 400 using the centralized controller 300 and the POTS 200. Here, the centralized controller 300 may be configured to handle packet and circuit control. Also, the centralized controller 300 may be configured to handle packet control with a separate control system for circuit control. In this exemplary embodiment, the controller 300 is communicatively coupled to the POTS 200 and provides control functionality such as managing the flow or forwarding tables of the POTS 200. Additionally, the controller 300 may also maintain the flow or forwarding tables of the edge routers 110 as well. As such, the requirement to maintain adjacencies between the edge routers 110 is reduced or eliminated over the POTS 200. The POTS 200 includes hardware, software, and firmware configured to manage, switch, etc. circuit and packet data. For example, the POTS 200 may include a packet client module 410, a circuit client module 420, a circuit fabric module 430, and packet modules 440. Collectively, the modules 410, 420, 430, 440 are configured to interface with signals to/from the POTS 200 and switch data in the signals at Layers 0, 1, 2, and/or 3. For example, the packet client 410 may include a data interface port (e.g., various Ethernet interface types). The circuit client 420 may include an optical interface port (e.g., various SONET, SDH, OTN, etc. types). The circuit fabric 430 may include a circuit switching fabric configured to switch SONET, SDH, OTN, etc. The packet module 440 may include a packet switching fabric configured to switch Layer 2 and/or 3 traffic. The modules 410, 420, 430, 440 may be communicatively coupled therebetween.

Figure 5:
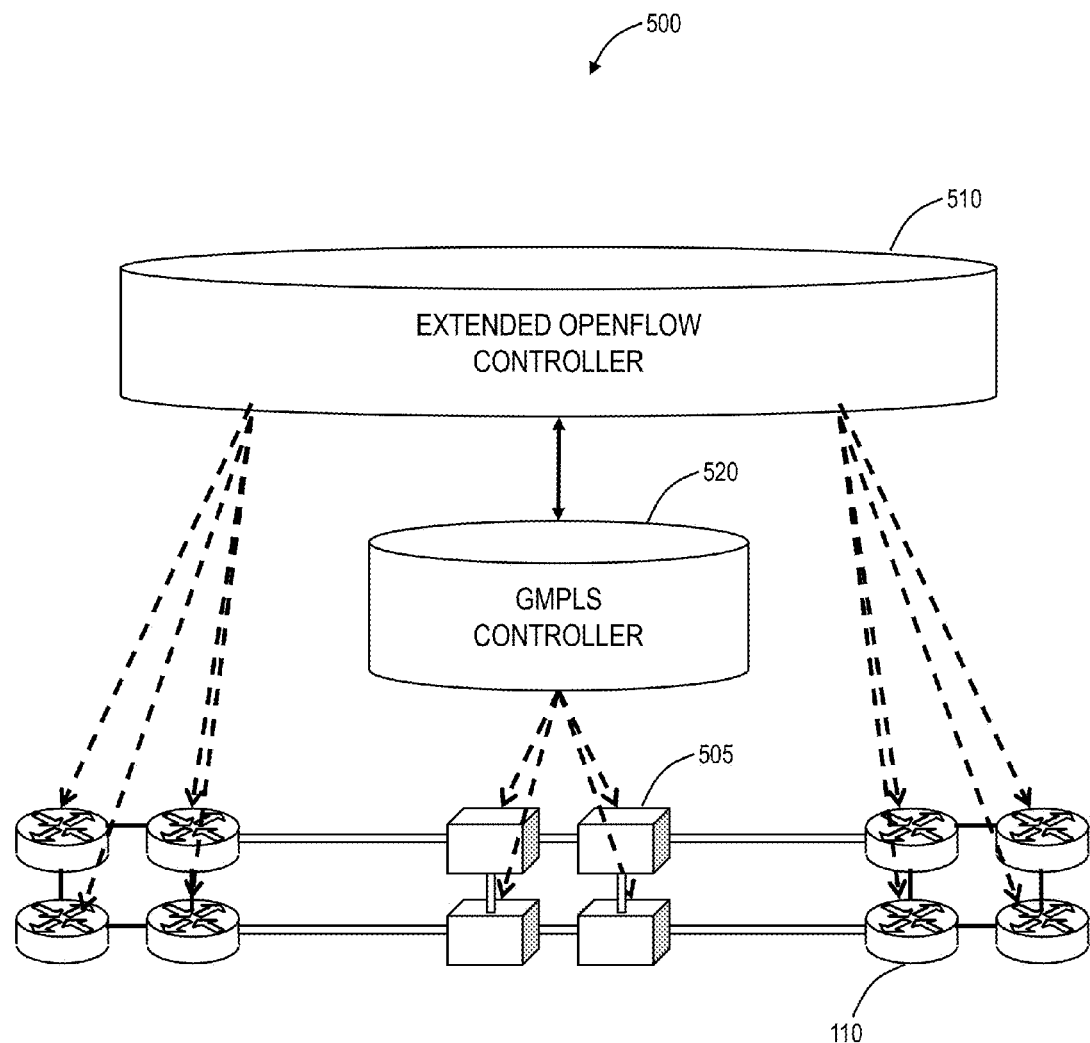
FIG. 5 is a network diagram of an IP network with optical nodes interconnecting edge routers in lieu of core routers.

Referring to FIG. 5, in an exemplary embodiment, a network diagram illustrates an IP network 500 with optical nodes 505 interconnecting edge routers 110 in lieu of core routers 112. In this exemplary embodiment, the network 500 includes an extended OpenFlow controller 510 communicatively coupled to the edge routers 110 for control thereof, and a GMPLS controller 520 communicatively coupled to the POTS 200 for control thereof. Also, the GMPLS controller 520 is communicatively coupled to the extended OpenFlow controller 510. Note, while this exemplary embodiment references OpenFlow for the controller 510 and GMPLS for the controller 520, those of ordinary skill in the art will recognize other mechanism may be used. In this exemplary embodiment, the model here is for separate physical elements handling packet and transport technologies, so that the OpenFlow controller 510 interacts with the separate GMPLS controller 520 for the optical nodes 505. The optical nodes 505 may include any network elements, nodes, etc. providing Layer 0 and/or Layer 1 transport and switching functionality. In this exemplary embodiment, control of the optical nodes 505 is through GMPLS although other control plane mechanisms are also contemplated. The network 500 requires that the edge routers 110 be under OpenFlow control as well as the optical nodes 505, again introducing scaling issues and requiring a more sophisticated controller.

Figure 6:
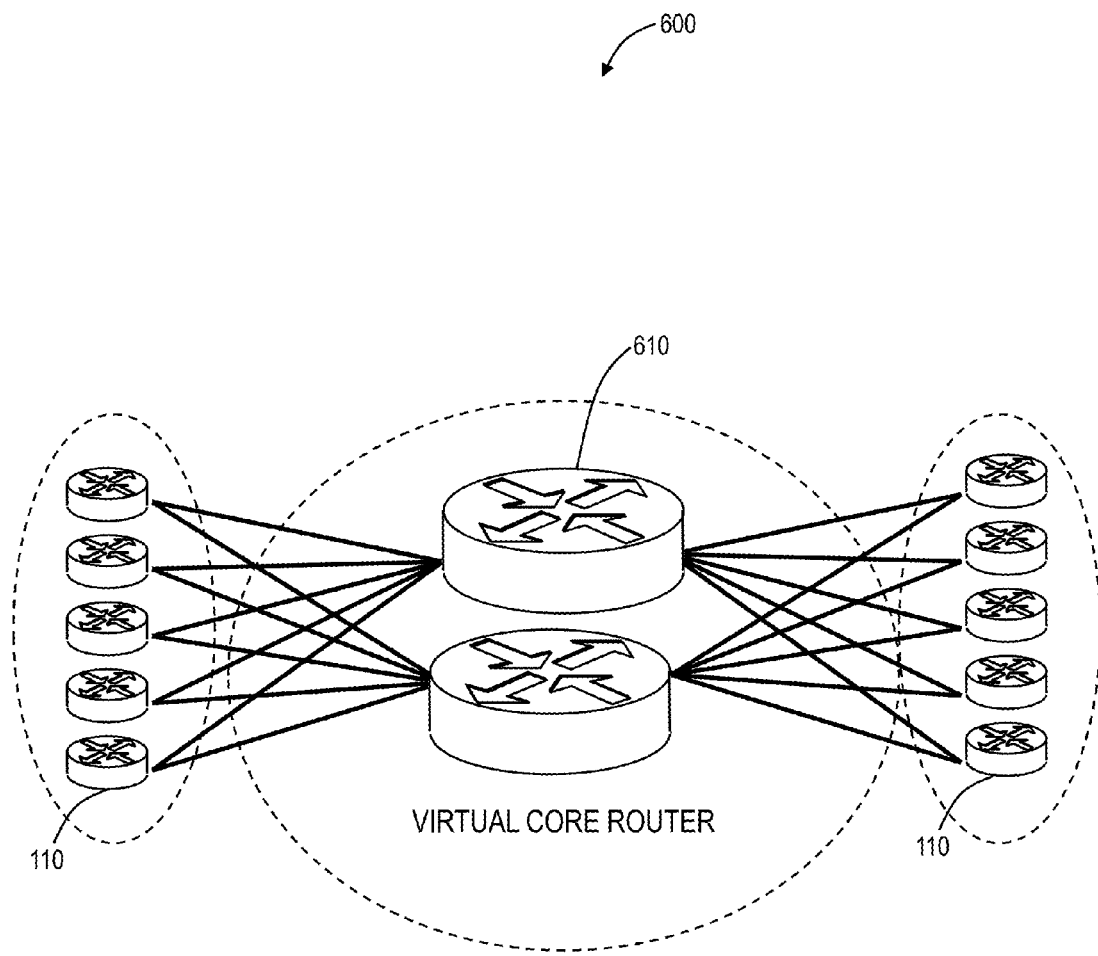
FIG. 6 is a network diagram of an IP network with a virtual core router in lieu of physically deployed core routers.

Referring to FIG. 6, in an exemplary embodiment, a network diagram illustrates an IP network 600 with a virtual core router 610. From an IP perspective, the desired target topology of the virtual router/switch systems and methods includes all of the edge routers 110 peering with a pair of virtualized core routers 610, meaning that routing adjacency is only maintained with the virtual core routers 610 and not with each of the other edge routers 110. The virtual core router 610 includes a domain of optical switches (i.e. the POTS 200) that operates as a single, virtualized router, using a control plane design combining centralized control of higher layer packet switching functions with distributed control over transport switching functions in order to leverage the ability for applications to view and control higher layer packet flows based on service features while keeping the lower layer transport functions simple, fast and efficient. Specifically, the virtual core router 610 may utilize the controller 300 for the centralized control and distributed control associated with the POTS 200. The virtual router/switch systems and methods act as a virtual router/switch in the sense that the network elements function as a network of routers from a transport viewpoint but represent themselves as a single, large virtual router/switch to the outside. The central IP controller 300 holds all of the IP layer software needed for interoperation with the surrounding community of routers (if there is one). The edge routers 110 peer with the single virtual router 610 at the IP layer, rather than peering directly with each other, thus avoiding the full mesh routing adjacency problem. In particular, the edge routers 110 view the POTS 200 and the controller 300 collectively as the virtual core router 610. For example, the edge routers 110 exchange messages with the virtual core router 610 as if it was a single router with the POTS 200 and the controller 300 acting cooperatively to perform the functionality of the virtual core router 610.

In comparison with the network 500, the network 600 leverages the fact that packet and optical switching capabilities reside on the same packet/optical transport system (i.e. the POTS 200). Here, the POTS 200 may communicate directly to the OpenFlow controller 510 with a simple model of a virtual optical switch connecting all of the packet switch interfaces. For the OpenFlow controller 510, the model is then simply to provision the optical forwarding table on the POTSs 200 to connect virtual ingress port to virtual egress port, where the ingress and egress are actually packet-switching modules in separate network elements. The OpenFlow controller 510 does not as a result need to communicate to every network element, only to the edge elements in the system, which handle IP layer packet functions. Further, the OpenFlow controller 510 is not required to communicate with the edge routers 110 in the network 600. The optical connections may be implemented through a distributed control plane associated with the POTS 200 without involvement of the OpenFlow controller 510.

Advantageously, the virtual router/switch systems and methods enable the edge routers 110 to view the core network as the single virtual router 610 (or pair of peer routers), so that the virtual router 610 is a node in the IP topology. The virtual core router 610 does more than simply distribute routing messages as would a route reflector, it generates its own link topology updates and would be part of any control plane interactions that see the virtual core router 610 as a hop in the network, for example, setting up an MPLS LSP between edge routers 110. This adds some further complexity to the functions of the virtual core router 610, but also allows it to do more than just snoop on the messages being sent between edge routers 110.

Figure 7:
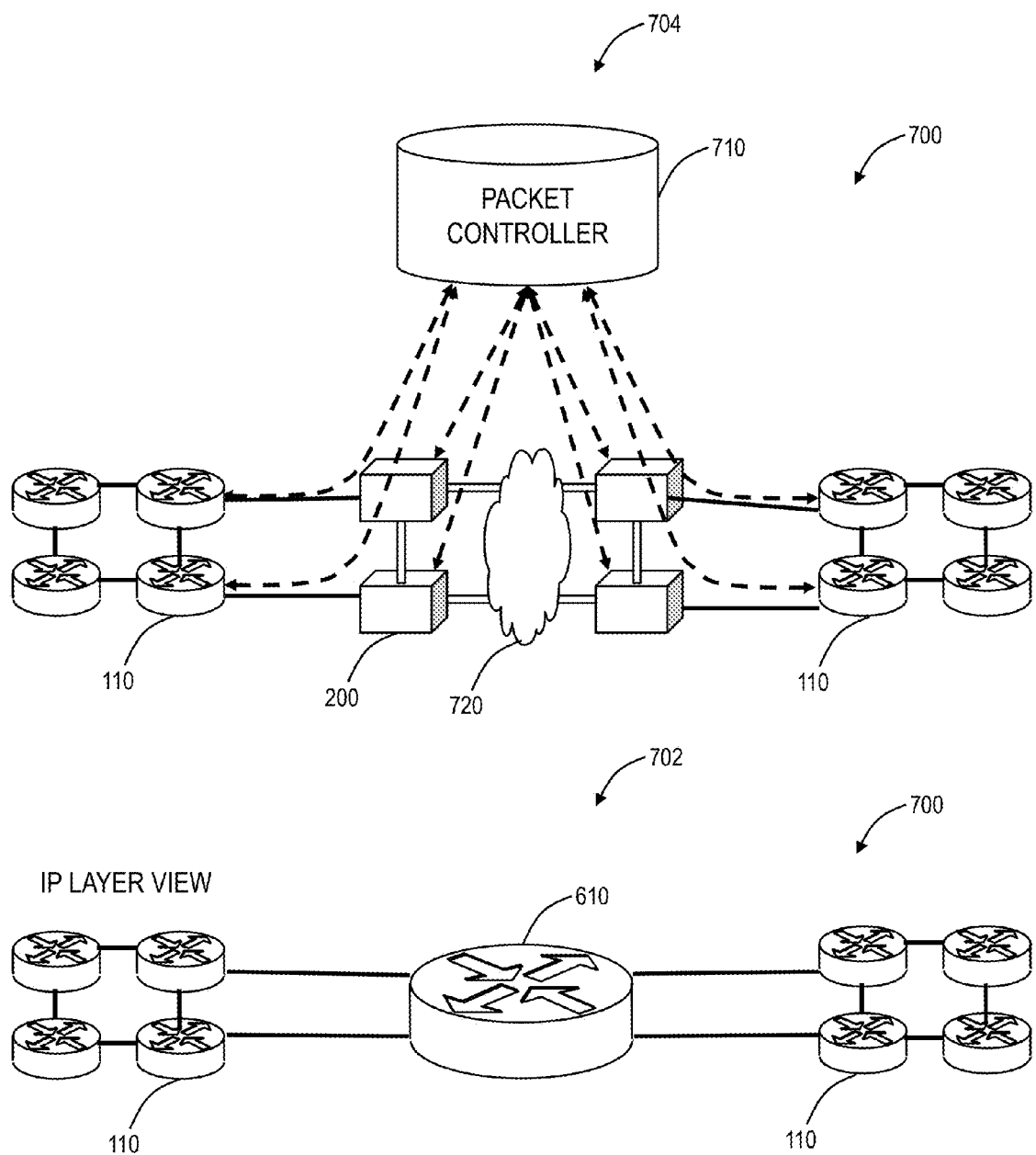
FIG. 7 is a network diagram of a network with an IP layer topology view compared to a Layer 0, 1, 2 topology view with the POTS and a packet controller forming a virtual core router.

Referring to FIG. 7, in an exemplary embodiment, a network 700 is illustrated with an IP layer topology view 702 compared to a Layer 0, 1, 2 topology view 704. At the IP layer 702, the network 700 matches the desired target of a large virtual router 610, while using a less expensive network of component systems. Specifically, the topology view 704 includes a network of the POTSs 200 in an interconnected fashion. The POTSs 200 are utilized to interconnect the edge routers 110 between one another in lieu of the core routers 112. Further, the POTSs 200 and the edge routers 110 connected thereto are communicatively coupled to a packet controller 710. For example, the edge routers 110 are communicatively coupled to the packet controller 710 through the POTSs 200. Further, the POTS 200 may be interconnected in a mesh configuration with additional nodes in a cloud 720. The nodes in the cloud 720 do not require connectivity to the packet controller 710. The packet controller 710 handles peering with each of the edge routers 110 through the POTSs 200 and uses the information received in order to determine the forwarding path to be followed within the POTS 200 network, and configures the packet functionality of the POTS 200 accordingly. In an exemplary embodiment, the packet controller 710 may include the controller 300 and utilize OpenFlow. In another exemplary embodiment, the packet controller 710 may utilize another method for peering with each of the edge routers 110 through the POTSs 200 and controlling the forwarding paths on the POTSs 200 accordingly.

In the POTS 200, forwarding at Layer 2 is controlled by the packet controller 710, which uses the IP layer topology 702 determined by the routing messages it receives to determine which edge router 110 is the target destination for a received message. The packet controller 710 then configures the packet forwarding tables at each of the POTSs 200 based on this information to forward packets matching a particular profile (e.g., IP source/destination address) into a tunnel that has been pre-provisioned to reach the associated target edge router 110. Importantly, at the IP layer topology 702, the edge routers 110 view the POTSs 200 and the packet controller 710 as the virtual core router 610. That is, the POTSs 200 cooperatively operate with one another to act as the virtual core router 610 with packet controller 710 configured to centralized control of the POTSs 200 with respect to packet switching functionality. Further, the edge routers 110 are configured to communicate control messages to the packet controller 710 through the POTSs 200.

Within the POTS 200 network, the POTSs 200 use a distributed control plane to interact with each other to set up a mesh of connections between client ports, adjusting bandwidth allocation according to traffic needs, without impacting the routing topology. In an exemplary embodiment, the control plane may utilize Automatically Switched Optical Network (ASON) as defined in G.8080/Y.1304, Architecture for the automatically switched optical network (ASON) (February 2005), the contents of which are herein incorporated by reference, and the like. In another exemplary embodiment, the control plane may utilize Generalized Multi-Protocol Label Switching (GMPLS) Architecture as defined in Request for Comments: 3945 (October 2004), the contents of which are herein incorporated by reference, and the like. In yet another exemplary embodiment, the control plane may utilize Optical Signaling and Routing Protocol (OSRP) from Ciena Corporation of Linthicum, Md. which is an optical routing protocol similar to PNNI (Private Network-to-Network Interface) and MPLS. Note, OSRP is a variation of ASON. Those of ordinary skill in the art will recognize the network and the control plane may utilize any type control plane for controlling the network elements, POTS 200, etc., and establishing connections therebetween. The control plane may be centralized, distributed, or a combination thereof. Only the POTS 200 edge nodes, i.e. the POTS 200 connected to the edge routers 110, need to interact with the packet controller 710, internal nodes in the POTS Cloud 720 interact with the POTS 200 edge nodes using the distributed control plane.

Figure 8:
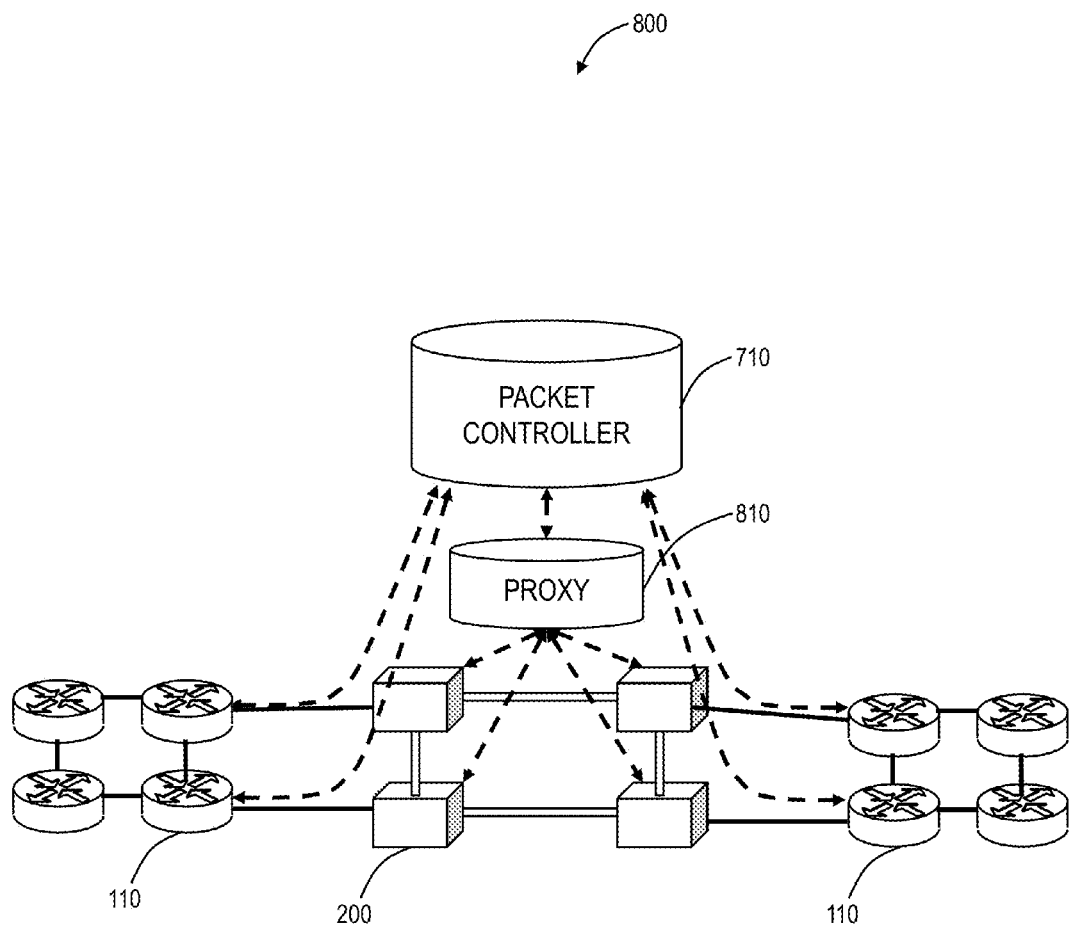
FIG. 8 is a network diagram of an IP network with the POTS communicatively coupled to a proxy which is communicatively coupled to the packet controller.

Referring to FIG. 8, in an exemplary embodiment, a network diagram illustrates an IP network 800 with the POTSs 200 communicatively coupled to a proxy 810 which is communicatively coupled to the packet controller 710. The network 800 is similar to the network 700 with the POTSs 200 each interfacing the packet controller 710 through the proxy 810. The proxy 810 may include a server or the like which interacts with the POTSs 200 such that the POTSs 200 appear to the packet controller 710 as a single large switching fabric from an IP perspective. This enables the packet controller 710 such as an OpenFlow controller 300 to follow the original model of controlling a single entity. That is, the POTSs 200 appear as a single entity through the proxy 810. In this exemplary embodiment of the network 800, the proxy 810 is a mediation device for the POTS 200 to the packet controller 710. In an exemplary embodiment, the proxy 810 may be part of an Element Management System (EMS), Network Management System (NMS), or the like. As described herein, the edge routers 110 still maintain a view of the POTSs 200, the packet controller 710, and the proxy 810 as the virtual core router 610. The edge routers 110 may communicate with the packet controller 710 through the POTSs 200 through the proxy 810.

Figure 9:
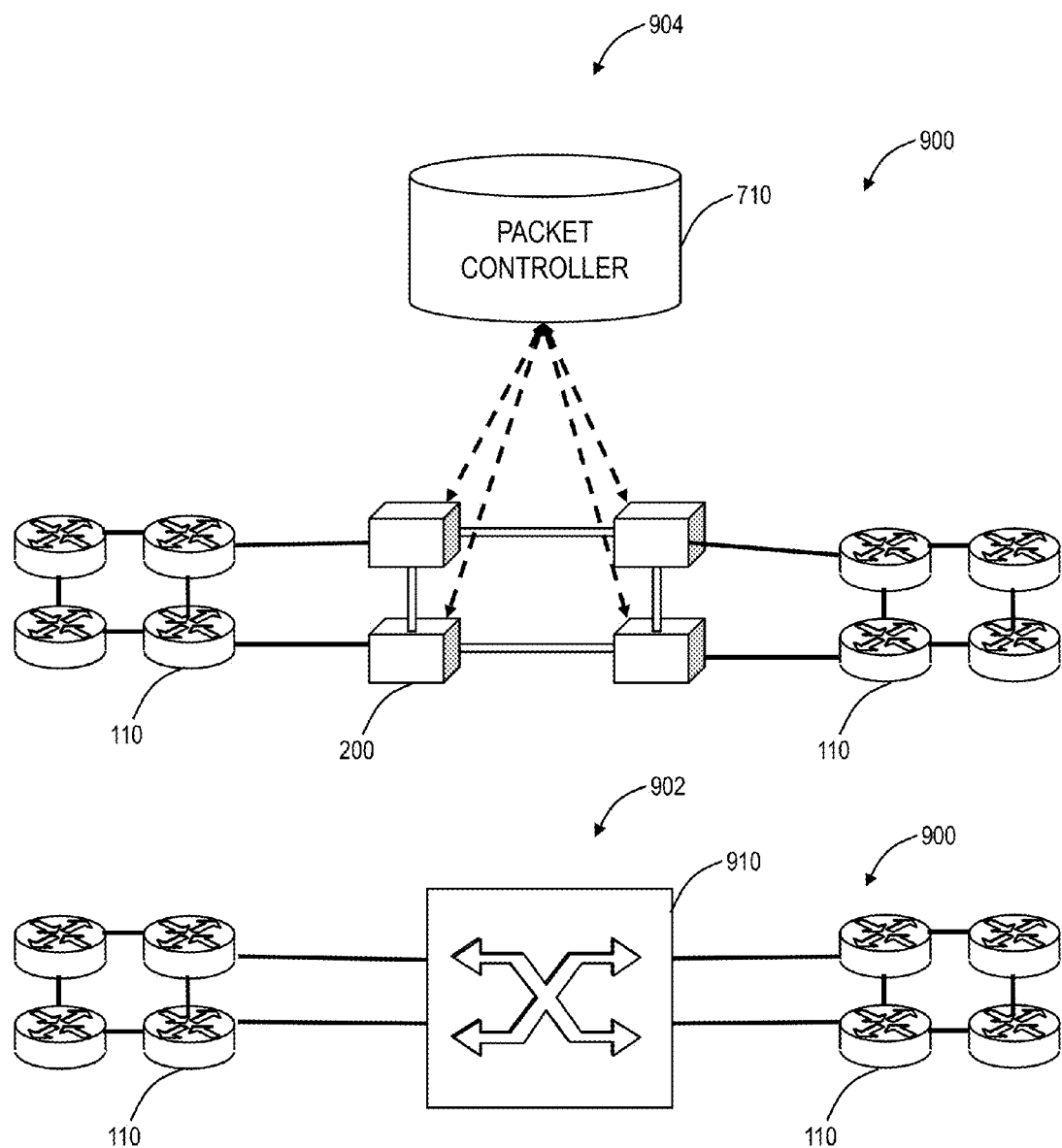
FIG. 9 is a network diagram of a network with an IP layer topology view compared to a Layer 0, 1, 2 topology view with the POTS and a packet controller acting as a single virtual switch.

Referring to FIG. 9, in an exemplary embodiment, a network 900 is illustrated with an IP layer topology view 902 compared to a Layer 0, 1, 2 topology view 904. In the network 900, the POTS 200 network together with the packet controller 710 act as a single virtual switch 910, rather than a router, and support switching functionality such as MPLS, MPLS-Transport Profile (MPLS-TP), or Ethernet rather than IP routing. This can be done by having the packet controller respond to control messages at the POTS 200 for the associated technology, e.g., Label Distribution Protocol (LDP) or Resource Reservation Protocol (RSVP) for MPLS, RSVP-GMPLS for MPLS-TP, or Spanning Tree Protocol (STP) for Ethernet. In the network 900, the packet controller 710 is not required to control the edge routers 110. Further, instead of seeing the core as a single virtual router, the edge routers 110 view the core as the single virtual switch 910. The network 900 includes a separation between the packet control and the packet forwarding entities so that instead of, for example, using Shortest Path Bridging-MAC (SPBM) between nodes in the core network, the forwarding tables would be configured from the packet controller 710.

Figure 10:
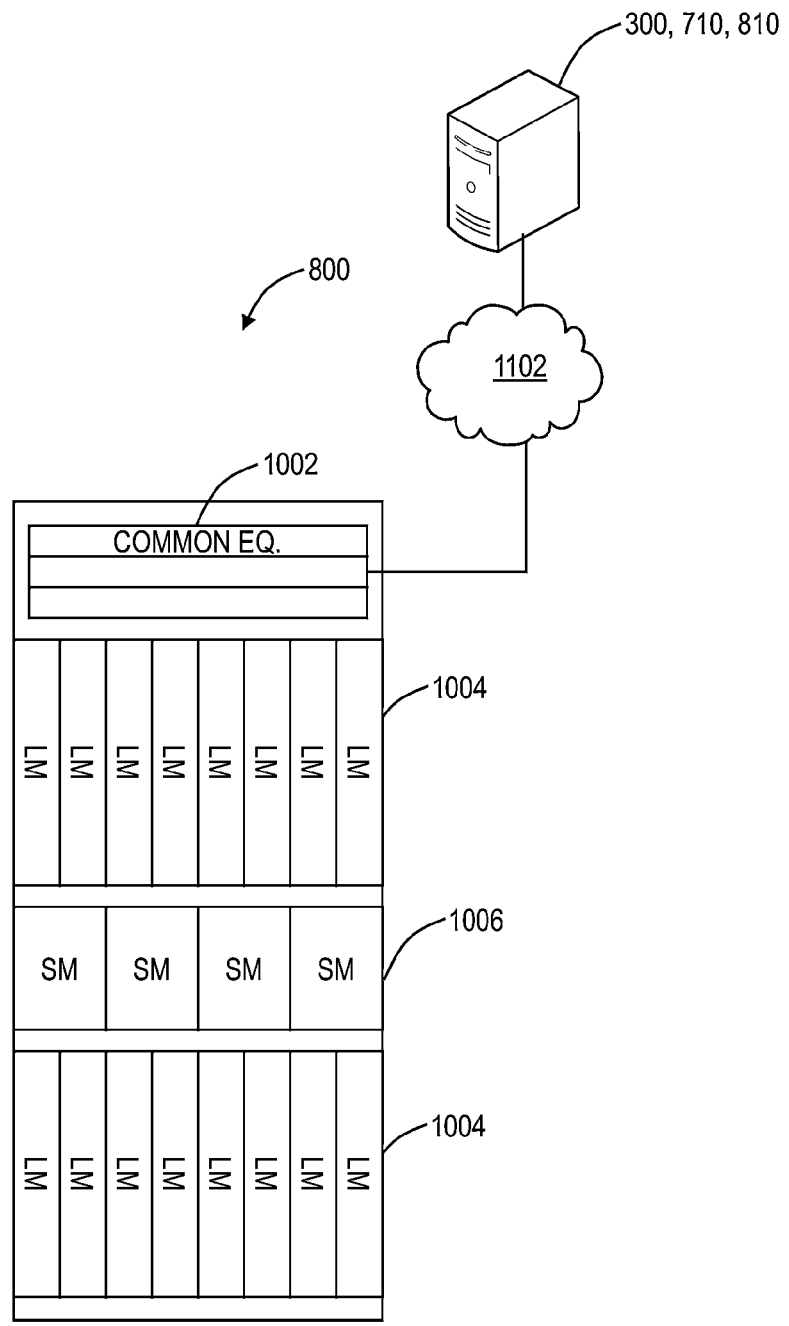
FIG. 10 is a block diagram of an exemplary optical network element for implementation of the POTS.

Referring to FIG. 10, in an exemplary embodiment, an exemplary optical network element is illustrated for implementation of the POTS 200. In an exemplary embodiment, the POTS 200 is a network element (NE) that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the POTS 200 may include a SONET add/drop multiplexer (ADM), an SDH ADM, an OTN ADM, a multi-service provisioning platform (MSPP), a digital cross-connect (DCS), etc. Generally, the POTS 200 includes common equipment 1002, line modules (LM) 1004, and switch modules (SM) 1006. The common equipment 1002 may include power; a control module; operations, administration, maintenance, and provisioning (OAM&P) access; and the like. The common equipment 1002 may connect to the controller 300, 710 and/or the proxy 810 through a data communication network 1102. Further, the common equipment 1002 may connect to a management system through the data communication network 1102. The management system may include a network management system (NMS), element management system (EMS), or the like. Additionally, the common equipment 1002 may include a control plane processor configured to operate a control plane and the systems and methods described herein.

The line modules 1004 may be communicatively coupled to the switch modules 1006, such as through a backplane, mid-plane, or the like. The line modules 1004 are configured to provide ingress and egress to the switch modules 1006, and are configured to provide interfaces for the OTN and Ethernet services described herein. In an exemplary embodiment, the line modules 1004 may form ingress and egress switches with the switch modules 1006 as center stage switches for a three-stage switch, e.g. a three stage Clos switch. The line modules 1004 may include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc. Further, the line modules 1004 may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 1004 may include DWDM interfaces, short reach interfaces, and the like, and may connect to other line modules 1004 on remote NEs, end clients, the edge routers 110, and the like. From a logical perspective, the line modules 1004 provide ingress and egress ports to the POTS 200, and each line module 1004 may include one or more physical ports.

The switch modules 1006 are configured to switch services between the line modules 1004. For example, the switch modules 1006 may provide wavelength granularity (Layer 0 switching), SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Payload Virtual Containers (OPVCs), etc.; Ethernet granularity; Digital Signal n (DSn) granularity such as DS0, DS1, DS3, etc.; and the like. Specifically, the switch modules 1006 may include both Time Division Multiplexed (TDM) (i.e., circuit switching) and packet switching engines. The switch modules 1006 may include redundancy as well, such as 1:1, 1:N, etc. Those of ordinary skill in the art will recognize the POTS 200 may include other components which are omitted for simplicity, and that the systems and methods described herein are contemplated for use with a plurality of different network elements with the POTS 200 presented as an exemplary type of network element. For example, in another exemplary embodiment, the POTS 200 may not include the switch modules 1006, but rather have the corresponding functionality in the line modules 1004 in a distributed fashion. For the POTS 200, other architectures providing ingress, egress, and switching therebetween are also contemplated for the systems and methods described herein.

Figure 11:
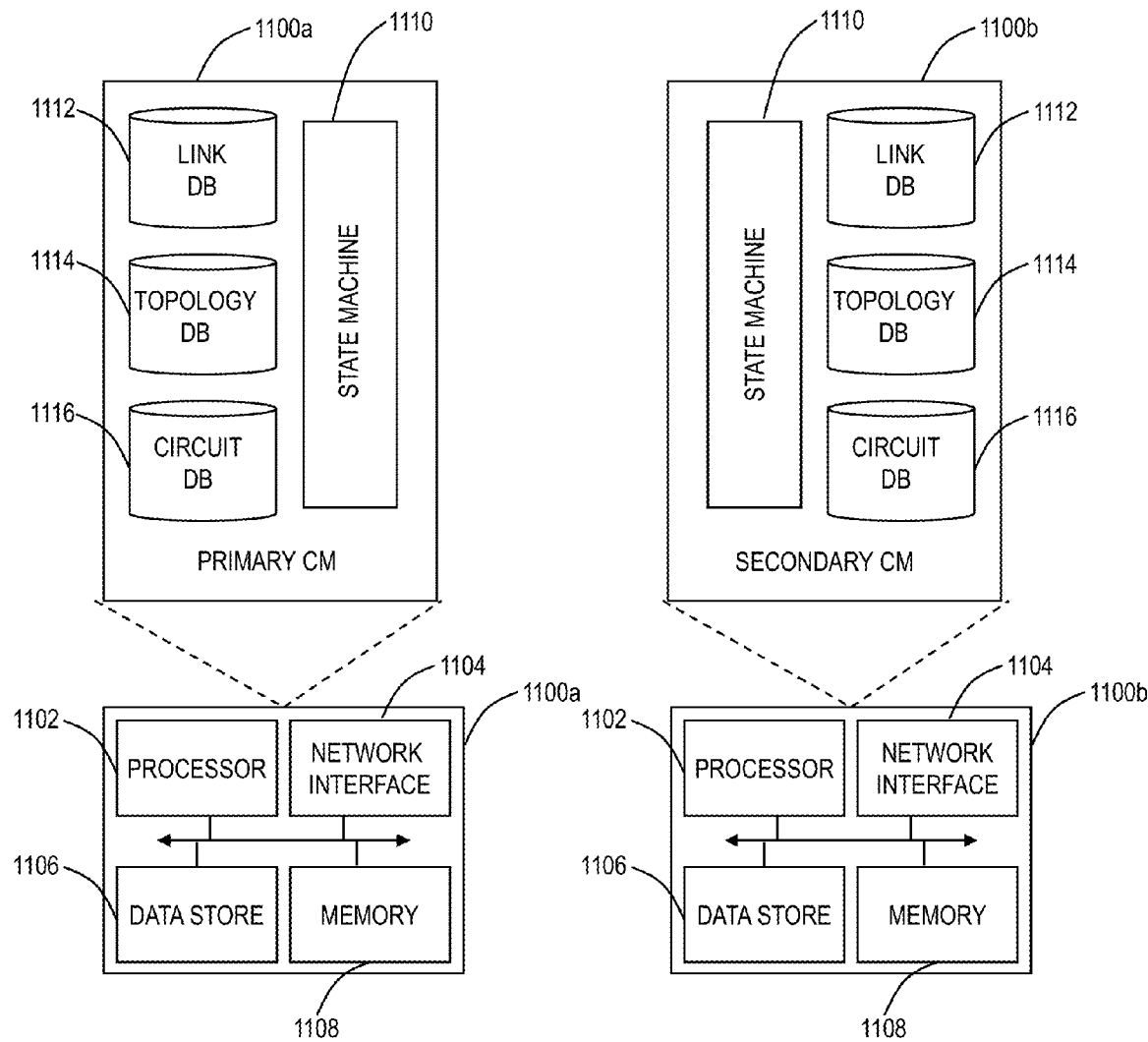
FIG. 11 is a block diagram of exemplary redundant control modules for the POTS to provide distributed control plane processing.

Referring to FIG. 11, in an exemplary embodiment, redundant control modules 1100 for the POTS 200 are illustrated to provide control plane processing. For example, the control plane can include OSRP, ASON, GMPLS, MPLS, and the like as described herein. The control modules 1100a, 1100b may be part of common equipment, such as common equipment 1002 in the POTS 200. The control modules 1100a, 1100b may include a processor 1102 which is hardware device for executing software instructions such as operating the control plane. The processor 1102 may be any custom made or commercially available processor, a central processing unit (CPU), an auxiliary processor among several processors associated with the control modules 1100a, 1100b, a semiconductor-based microprocessor (in the form of a microchip or chip set), or generally any device for executing software instructions. When the control modules 1100a, 1100b are in operation, the processor 1102 is configured to execute software stored within memory, to communicate data to and from the memory, and to generally control operations of the control modules 1100a, 1100b pursuant to the software instructions.

The control modules 1100a, 1100b may also include a network interface 1104, a data store 1106, memory 1108, and the like, all of which are communicatively coupled therebetween and with the processor 1102. The network interface 1104 may be used to enable the control modules 1100a, 1100b to communicate on a network, such as to communicate control plane information to other control modules, to the management system, to the controller 300, 710 and/or the proxy 810, and the like. The network interface 1104 may include, for example, an Ethernet card (e.g., 10BaseT, Fast Ethernet, Gigabit Ethernet) or a wireless local area network (WLAN) card (e.g., 802.11a/b/g). The network interface 1104 may include address, control, and/or data connections to enable appropriate communications on the network. The data store 1106 may be used to store data, such as control plane information received from POTS 200 or other CMs, provisioning data, OAM&P data, etc. The data store 1106 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1106 may incorporate electronic, magnetic, optical, and/or other types of storage media. The memory 1108 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 1108 may incorporate electronic, magnetic, optical, and/or other types of storage media. Note that the memory 1108 may have a distributed architecture, where various components are situated remotely from one another, but may be accessed by the processor 1102.

From a logical perspective, each of the control modules 1100a, 1100b may include a state machine 1110, a link database (DB) 1112, a topology DB 1114, and a circuit DB 1116. The control modules 1100a, 1100b are responsible for all control plane processing. Generally, a control plane includes software, processes, algorithms, etc. that control configurable features of a network, such as automating discovery of network elements, capacity on the links, port availability on the network elements, connectivity between ports; dissemination of topology and bandwidth information between the network elements; calculation and creation of paths for connections; network level protection and restoration; and the like. The control modules 1100a, 1100b may be configured in a redundant 1+1, 1:1, etc. configuration. The state machine 1110 is configured to implement the behaviors described herein. The DBs 1112, 1114, 1116 may be stored in the memory 1108 and/or the data store 1106. The link DB 1112 includes updated information related to each link in a network including. The topology DB 1114 includes updated information related to the network topology, and the circuit DB 1116 includes a listing of terminating circuits and transiting circuits at the POTS 200 where the control modules 1100a, 1100b are located.

The control modules 1100a, 1100b may utilize control plane mechanisms to maintain the DBs 1112, 1114, 1116. For example, HELLO messages can be used to discover and verify neighboring ports, nodes, protection bundles, boundary links, and the like. Also, the DBs 1112, 1114, 1116 may share topology state messages to exchange information to maintain identical data. Collectively, the state machine 1110 and the DBs 1112, 1114, 1116 may be utilized to advertise topology information, capacity availability, and provide connection management (provisioning and restoration). For example, each link in a network may have various attributes associated with it such as, for example, line protection, available capacity, total capacity, administrative weight, protection bundle identification, delay, designation of boundary link, and the like. The state machine 1110 and the DBs 1112, 1114, 1116 may be configured to provide automated end-to-end provisioning. For example, a route for a connection may be computed from originating node to terminating node and optimized using Dijkstra's Algorithm, i.e. shortest path from source to a destination based on the least administrative cost or weight, subject to a set of user-defined constraints.

Further, the control modules 1100a, 1100b are configured to communicate to other control modules 1100a, 1100b in other nodes on the network. This communication may be either in-band or out-of-band. For SONET networks and similarly for SDH networks, the control modules 1100a, 1100b may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the present invention includes an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets.

Figure 12:
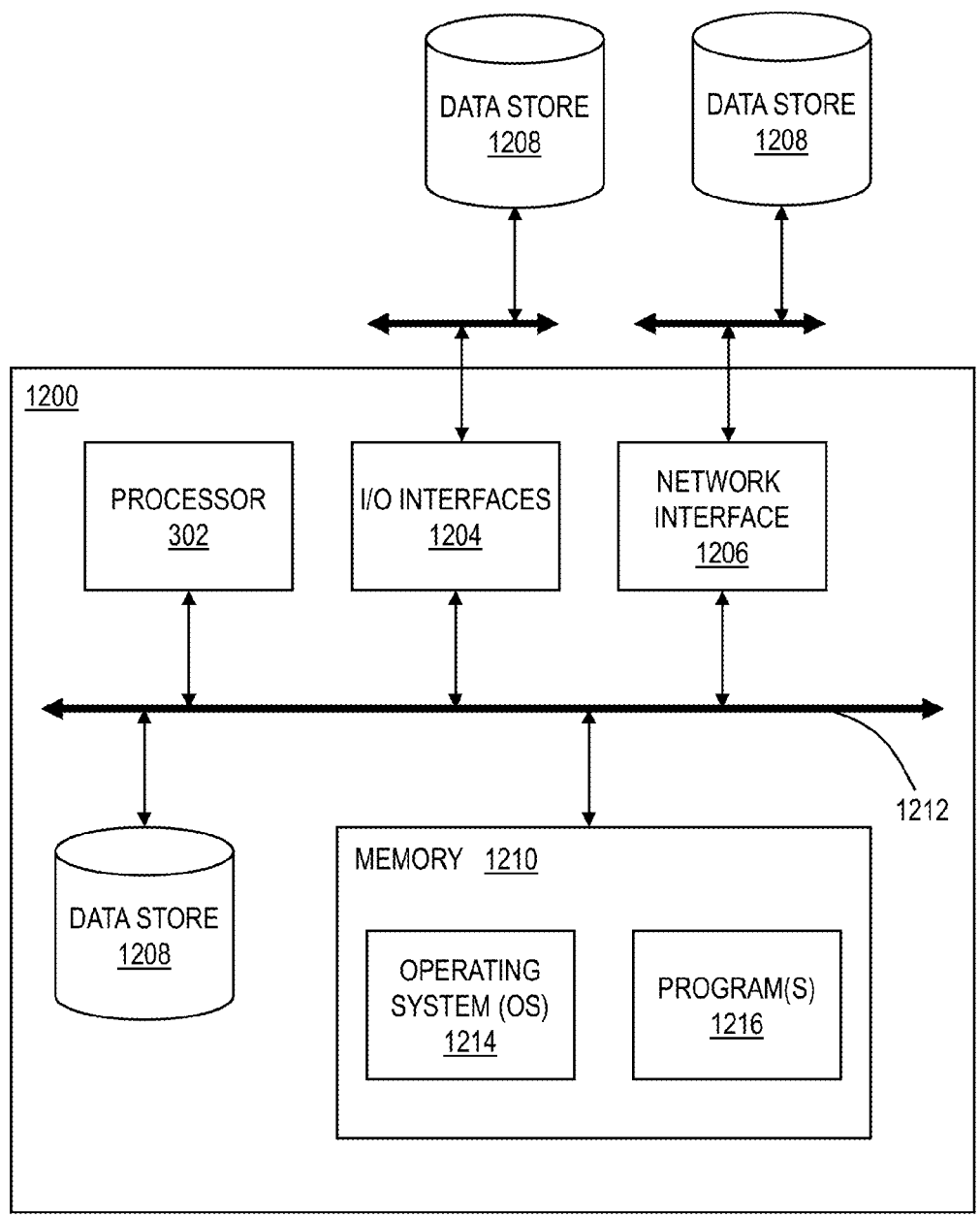
FIG. 12 is a block diagram of a server which may be used for implementation of a centralized controller and/or a proxy for the centralized controller.

Referring to FIG. 12, in an exemplary embodiment, a block diagram illustrates a server 1200 which may be used for implementation of the controller 300, 710 and proxy 810 described herein. The server 1200 may be a digital computer that, in terms of hardware architecture, generally includes a processor 1202, input/output (I/O) interfaces 1204, a network interface 1206, a data store 1208, and memory 1210. It should be appreciated by those of ordinary skill in the art that FIG. 12 depicts the server 1200 in an oversimplified manner, and a practical embodiment may include additional components and suitably configured processing logic to support known or conventional operating features that are not described in detail herein. The components (1202, 1204, 1206, 1208, and 1210) are communicatively coupled via a local interface 1212. The local interface 1212 may be, for example but not limited to, one or more buses or other wired or wireless connections, as is known in the art. The local interface 1212 may have additional elements, which are omitted for simplicity, such as controllers, buffers (caches), drivers, repeaters, and receivers, among many others, to enable communications. Further, the local interface 1212 may include address, control, and/or data connections to enable appropriate communications among the aforementioned components.

The processor 1202 is a hardware device for executing software instructions. The processor 1202 may be any custom made or commercially available processor, a central processing unit (CPU), an auxiliary processor among several processors associated with the server 1200, a semiconductor-based microprocessor (in the form of a microchip or chip set), or generally any device for executing software instructions. When the server 1200 is in operation, the processor 1202 is configured to execute software stored within the memory 1210, to communicate data to and from the memory 1210, and to generally control operations of the server 1200 pursuant to the software instructions. The I/O interfaces 1204 may be used to receive user input from and/or for providing system output to one or more devices or components. User input may be provided via, for example, a keyboard, touch pad, and/or a mouse. System output may be provided via a display device and a printer (not shown). I/O interfaces 1204 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 1206 may be used to enable the server 1200 to communicate on a network, such as to the edge routers 110 and/or the POTS 200. The network interface 1206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 1206 may include address, control, and/or data connections to enable appropriate communications on the network. A data store 1208 may be used to store data. The data store 1208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1208 may incorporate electronic, magnetic, optical, and/or other types of storage media. In one example, the data store 1208 may be located internal to the server 1200 such as, for example, an internal hard drive connected to the local interface 1212 in the server 1200. Additionally in another embodiment, the data store 1208 may be located external to the server 1200 such as, for example, an external hard drive connected to the I/O interfaces 1204 (e.g., SCSI or USB connection). In a further embodiment, the data store 1208 may be connected to the server 1200 through a network, such as, for example, a network attached file server.

The memory 1210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 1210 may incorporate electronic, magnetic, optical, and/or other types of storage media. Note that the memory 1210 may have a distributed architecture, where various components are situated remotely from one another, but can be accessed by the processor 1202. The software in memory 1210 may include one or more software programs, each of which includes an ordered listing of executable instructions for implementing logical functions. The software in the memory 1210 includes a suitable operating system (O/S) 1214 and one or more programs 1216. The operating system 1214 essentially controls the execution of other computer programs, such as the one or more programs 1216, and provides scheduling, input-output control, file and data management, memory management, and communication control and related services. The one or more programs 1216 may be configured to implement the various processes, algorithms, methods, techniques, etc. described herein. For example, the server 1200 may be used to implement, through the one or more programs 1216, the controller 300, 710 and/or the proxy 810 for centralized control of the edge routers 110 and the POTS 200.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An Internet Protocol network, comprising:
a plurality of edge routers;
a virtual core router interconnecting the plurality of edge routers;
wherein the virtual core router comprises a domain of interconnected optical switches in communication with a packet controller, the domain of interconnected optical switches and the packet controller are configured to cooperatively implement the virtual core router such that the plurality of edge routers view the domain of interconnected optical switches and the packet controller as the virtual core router from a topology perspective;
a centralized control plane for packet switching functions on the interconnected optical switches;
a distributed control plane for transport switching functions on the interconnected optical switches; and
a proxy communicatively coupled to optical switches connected to the plurality of edge routers;
wherein the proxy is communicatively coupled to the packet controller, the plurality of edge routers are configured to exchange messages to the packet controller through the optical switches connected to the plurality of edge routers.

2. The Internet Protocol network of claim 1, wherein the plurality of edge routers are configured to peer with the virtual core router in lieu of peering directly with one another.

3. The Internet Protocol network of claim 1, wherein optical switches connected to the plurality of edge routers are communicatively coupled to the packet controller, the plurality of edge routers are configured to exchange messages to the packet controller through the optical switches connected to the plurality of edge routers.

4. The Internet Protocol network of claim 1, wherein the packet controller views the optical switches as a single entity through the proxy, and wherein the proxy comprising a network or element management system.

5. The Internet Protocol network of claim 1, wherein the packet controller is configured to provision optical forwarding tables in the optical switches to connect virtual ingress port to virtual egress port.

6. The Internet Protocol network of claim 5, wherein the virtual ingress port and the virtual egress port are disposed in separate network elements of the optical switches.

7. The Internet Protocol network of claim 1, wherein the virtual core router is configured to generate link topology updates and is part of control plane interactions in the centralized control plane for packet switching functions.

8. The Internet Protocol network of claim 1, wherein the optical switches connected to the plurality of edge routers are communicatively coupled to the packet controller such that the virtual core router functions as a single virtual switch to the plurality of edge routers, and wherein the packet controller is configured to respond to control messages from the plurality of edge routers through the optical switches connected to the plurality of edge routers.

9. A network, comprising:
a plurality of interconnected packet optical transport systems, at least two of the packet optical transport systems communicatively coupled to at least two edge routers;
a packet controller in communication with the plurality of interconnected packet optical transport systems;
a centralized control plane for packet switching functions;
a distributed control plane for transport switching functions on the plurality of interconnected packet optical transport systems;
wherein, from a topology perspective, the at least two edge routers view the plurality of interconnected packet optical transport systems as a single entity for the packet switching functions;
wherein the at least two of the packet optical transport systems are communicatively coupled to the packet controller; and
a proxy between the at least two of the packet optical transport systems and the packet controller;
wherein the packet controller views the at least two of the packet optical transport systems as a single device through the proxy.

10. The network of claim 9, wherein the single entity comprises a virtual core router and the at least two edge routers are configured to peer with the virtual core router in lieu of peering directly with one another.

11. The network of claim 9, wherein the single entity comprises a virtual core switch viewed by the at least two edge routers as a single large fabric, and wherein the packet controller is configured to respond to control messages from the at least two edge routers to the at least two of the packet optical transport systems.

12. The network of claim 9, wherein the packet controller is configured to provision optical forwarding tables in the at least two of the packet optical transport systems to connect virtual ingress port to virtual egress port.

13. The network of claim 12, wherein the virtual ingress port and the virtual egress port are disposed in separate network elements.

14. A network, comprising:
a plurality of edge routers;
the plurality of edge routers interconnected between one another through a virtual device, the virtual device comprising a plurality of interconnected optical switches and a packet controller communicatively coupled to the plurality of interconnected optical switches;
a distributed control plane for transport switching functions on the plurality of interconnected optical switches; and
a centralized control plane for packet switching functions on the plurality of interconnected optical switches;
wherein the virtual device is configured to generate link topology updates and is part of control plane interactions in the centralized control plane for packet switching functions.

15. The network of claim 14, further comprising:
peering between the plurality of edge routers and the virtual device such that the plurality of edge routers are not required to maintain routing adjacencies between one another.

16. The network of claim 14,
wherein the virtual device is implemented though the plurality of interconnected optical switches and the packet controller to remove core routers between the plurality of edge routers.

\* \* \* \* \*